US009702239B2

(12) United States Patent
Russell et al.

(10) Patent No.: US 9,702,239 B2
(45) Date of Patent: Jul. 11, 2017

(54) METHODS FOR IMPROVED PROPPANT SUSPENSION IN HIGH SALINITY, LOW VISCOSITY SUBTERRANEAN TREATMENT FLUIDS

(71) Applicant: Halliburton Energy Services, Inc., Houston, TX (US)

(72) Inventors: Aaron Gene Russell, Houston, TX (US); Dipti Singh, Houston, TX (US); HsinChen Chung, Houston, TX (US); Xiangnan Ye, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 100 days.

(21) Appl. No.: 13/928,653

(22) Filed: Jun. 27, 2013

(65) Prior Publication Data
US 2015/0000910 A1    Jan. 1, 2015

(51) Int. Cl.
*E21B 43/267* (2006.01)
*C09K 8/80* (2006.01)
*C09K 8/68* (2006.01)
*C09K 8/88* (2006.01)
*C09K 8/90* (2006.01)
C09K 8/52 (2006.01)
C09K 8/60 (2006.01)

(52) U.S. Cl.
CPC ............ *E21B 43/267* (2013.01); *C09K 8/685* (2013.01); *C09K 8/80* (2013.01); *C09K 8/887* (2013.01); *C09K 8/90* (2013.01); C09K 8/52 (2013.01); C09K 8/605 (2013.01); C09K 2208/12 (2013.01); C09K 2208/24 (2013.01); C09K 2208/26 (2013.01)

(58) Field of Classification Search
CPC ................................ E21B 43/267; C09K 8/80
USPC ................ 166/259, 305.1, 307, 308.1, 308.2
See application file for complete search history.

(56) References Cited

U.S. PATENT DOCUMENTS

| 3,938,594 | A | 2/1976 | Rhudy et al. |
| 4,532,052 | A * | 7/1985 | Weaver et al. ............... 507/222 |
| 5,905,061 | A | 5/1999 | Patel |
| 5,977,031 | A | 11/1999 | Patel |
| 6,782,735 | B2 | 8/2004 | Walters et al. |

(Continued)

FOREIGN PATENT DOCUMENTS

| WO | 2010012975 A1 | 2/2010 |
| WO | 2011023965 A1 | 3/2011 |

(Continued)

OTHER PUBLICATIONS

International Search Report and Written Opinion for PCT/US2014/043653 dated Oct. 24, 2014.

*Primary Examiner* — Silvana Runyan
(74) *Attorney, Agent, or Firm* — McDermott Will & Emery LLP

(57) ABSTRACT

Introducing a treatment fluid comprising proppant particulates into a subterranean formation, the treatment fluid comprising a high salt concentration base fluid, a charged polymeric gelling agent, and proppant particulates suspended therein, wherein the high salt concentration base fluid comprises a concentration of salt in the range of from about 0.5% to saturation, and wherein the treatment fluid has a bulk viscosity of from about 30 cP to about 150 cP at a shear rate of about 40 sec$^{-1}$.

11 Claims, 3 Drawing Sheets

(56) References Cited

U.S. PATENT DOCUMENTS

| | | | |
|---|---|---|---|
| 6,810,959 B1 | 11/2004 | Qu et al. | |
| 6,828,279 B2 | 12/2004 | Patel et al. | |
| 7,195,065 B2 | 3/2007 | Kelly et al. | |
| 7,225,874 B2 | 6/2007 | Harris et al. | |
| 7,287,593 B2 * | 10/2007 | Hutchins et al. | 166/308.5 |
| 7,345,013 B2 * | 3/2008 | Fraser | 507/271 |
| 7,392,842 B2 | 7/2008 | Morgan et al. | |
| 7,534,745 B2 | 5/2009 | Taylor et al. | |
| 7,645,723 B2 | 1/2010 | Kirsner et al. | |
| 7,696,131 B2 | 4/2010 | Oyler et al. | |
| 7,712,526 B2 | 5/2010 | Morgan et al. | |
| 7,814,980 B2 | 10/2010 | Bryant et al. | |
| 8,266,949 B2 | 9/2012 | Harris et al. | |
| 8,372,789 B2 | 2/2013 | Harris et al. | |
| 2005/0065040 A1 | 3/2005 | Weaver et al. | |
| 2005/0107503 A1 * | 5/2005 | Couillet et al. | 524/249 |
| 2007/0169932 A1 * | 7/2007 | Lindvig | C09K 8/52 166/250.1 |
| 2009/0023614 A1 * | 1/2009 | Sullivan et al. | 507/214 |
| 2009/0111716 A1 * | 4/2009 | Hough | C09K 8/584 507/214 |
| 2011/0023965 A1 | 2/2011 | Yamaguchi et al. | |
| 2011/0219856 A1 | 9/2011 | Tonmukayakul et al. | |
| 2012/0231980 A1 * | 9/2012 | Zhang | C09K 8/035 507/206 |
| 2012/0267103 A1 | 10/2012 | Willberg et al. | |

FOREIGN PATENT DOCUMENTS

| | | |
|---|---|---|
| WO | 2013070360 A1 | 5/2013 |
| WO | 2014209882 A1 | 12/2014 |

* cited by examiner

METHODS FOR IMPROVED PROPPANT SUSPENSION IN HIGH SALINITY, LOW VISCOSITY SUBTERRANEAN TREATMENT FLUIDS

BACKGROUND

The present invention relates to methods and compositions of suspending proppant in high salinity, low viscosity subterranean treatment fluids.

Subterranean wells (such as hydrocarbon producing wells and water wells) are often stimulated by hydraulic fracturing treatments. In hydraulic fracturing treatments, a viscous fracturing fluid, which may also function as a carrier fluid to carry particulates, is pumped into a portion of a subterranean formation at a rate and pressure such that the subterranean formation breaks down and one or more fractures are formed. Typically, particulates, such as graded sand, are suspended in a portion of the fracturing fluid or another fluid and then deposited into the fractures. These particulates, referred to herein as "proppant particulates" or simply "proppant," serve to prevent the fractures from fully closing once the hydraulic pressure is removed. By keeping the fracture from fully closing, the proppant aids in forming conductive paths through which fluids may flow.

Fracturing fluids are typically aqueous based fluids, which are viscosified using gelling agents (e.g., polymers) or gelling agents in combination with crosslinking agents. Often, however, premature settling of the proppant particulates may result in complete or partial fracture closure after hydraulic pressure is removed, thereby reducing the production potential of the formation. Additionally, if a tip screen-out operation is performed, premature settling of proppant particulates may result in decreased or completed loss of fluid pumpability due to pressure increases. Also, fluid loss from the fracturing fluid into undesirable locations within the subterranean formation may affect the production potential of the formation and/or the fluid itself. Fluid loss may be controlled by the gelling agents and/or crosslinking agents used to viscosify the fluid or by adding particulates to the fluid for the purpose of closing pore throats or other avenues for fluid loss.

Thus, fracturing fluid design can be very complex, and fracturing fluids are often designed for narrow sets of reservoir and/or pumping constraints. The complexity is further exacerbated because the availability of vast quantities of fresh water for subterranean formation operations has recently become substantially reduced both for environmental and political reasons. As a result, fracturing operations are preferably performed with sources of water such as seawater, produced water from a formation, or reclaimed water. These water sources, however, do not possess the predictable chemistry that fresh water possesses and typically contain high salt concentrations of diverse ions, often in a concentration of greater than 0.5%, greater than 3%, or even greater than 20% to saturation. This "high salt concentration water" or "high salt concentration base fluid" has historically been less effective as a stable fracturing fluid capable of relatively uniformly suspending proppant particulates for delivery into a fracture, largely because gelling agents and/or crosslinking agents may be salted out of the high salt concentration base fluid due to interaction with the anionic polymeric chain of the gelling agent and/or crosslinking agent or due to syneresis. Indeed, the ability of these gelling agents and/or crosslinking agents to viscosify fluids is significantly reduced as salt concentration increases and, in general, fluids with poor viscosity are considered poor at proppant suspension. Therefore, an effective fracturing fluid having a high salt concentration base fluid that may be used in subterranean formation operations may be of benefit to one of ordinary skill in the art.

BRIEF DESCRIPTION OF THE DRAWINGS

The following figures are included to illustrate certain aspects of the present invention, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1:
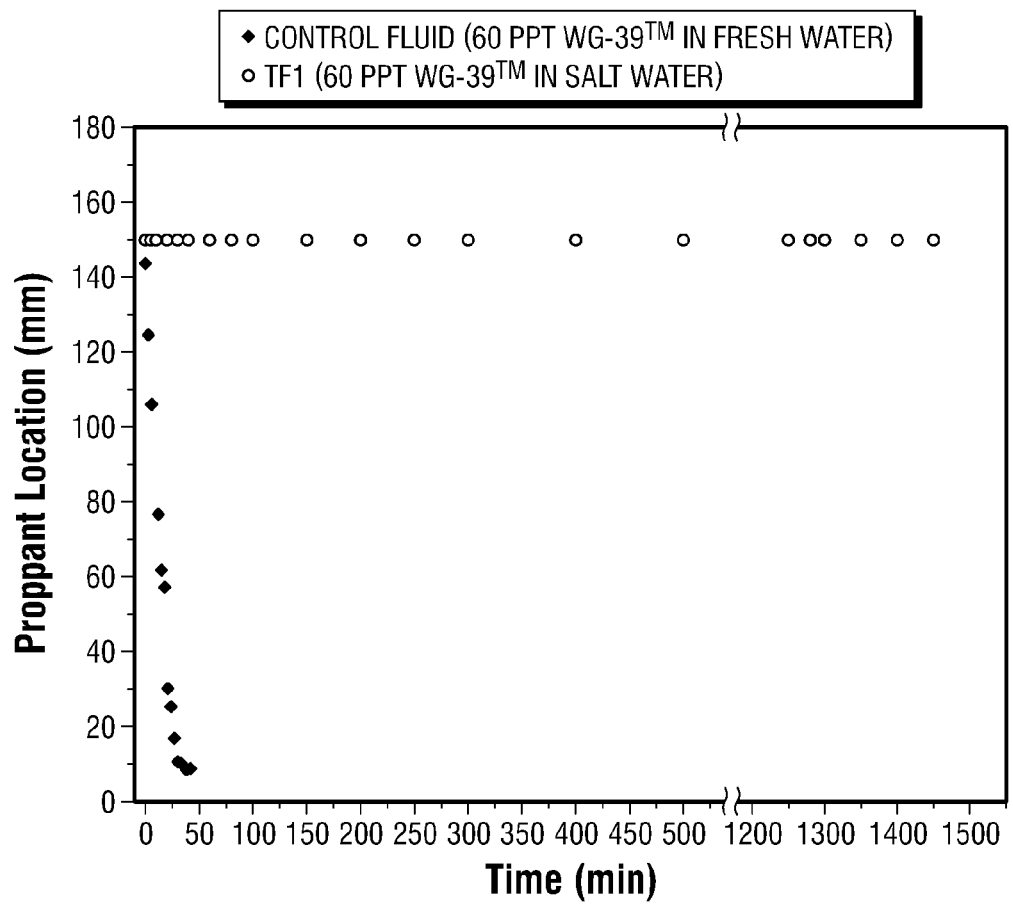
FIG. 1 depicts the dynamic settling velocity of proppant particulates in the high salinity, low viscosity subterranean treatment fluids of the present invention.

The present invention relates to methods and compositions of suspending proppant in high salinity, low viscosity subterranean treatment fluids. Specifically, the present invention relates to methods and compositions of a subterranean fluid comprising a high salt concentration base fluid and a charged polymeric gelling agent capable of suspending proppant while exhibiting low viscosity. Although the methods of the present invention are often described herein as applying the fracturing operations, they may also be of use in other subterranean formation operations, such as lost circulation operations, sand control operations, completion operations, acidizing operations, scale inhibiting operations, water-blocking operations, clay stabilizer operations, frac-packing operations, gravel packing operations, wellbore strengthening operations, sag control operations, and the like. One of ordinary skill in the art, with the benefit of this disclosure, will recognize whether the treatment fluids of the present invention will benefit a particular subterranean operation. By way of example, the treatment fluids of the present invention may be well suited for solids-carrying treatments using seawater as a base fluid.

One or more illustrative embodiments incorporating the invention disclosed herein are presented below. Not all features of an actual implementation are described or shown in this application for the sake of clarity. It is understood that in the development of an actual embodiment incorporating the present invention, numerous implementation-specific decisions must be made to achieve the developer's goals, such as compliance with system-related, business-related, government-related and other constraints, which vary by implementation and from time to time. While a developer's efforts might be complex and time-consuming, such efforts would be, nevertheless, a routine undertaking for those of ordinary skill the art having benefit of this disclosure. While compositions and methods are described in terms of "comprising" various components or steps, the compositions and methods can also "consist essentially of" or "consist of" the various components and steps. When "comprising" is used in a claim, it is open-ended.

In some embodiments, the present invention provides a method of treating a subterranean formation comprising introducing a treatment fluid comprising a high salt concentration base fluid, a charged polymeric gelling agent, and proppant particulates suspended therein into the subterranean formation. The term "high salt concentration base fluid" as used herein refers to a fluid having a concentration of salt in the range of from about 0.5% to saturation. In some embodiments, the treatment fluids of the present invention may exhibit a bulk viscosity in the range of from about 30 centipoise ("cP") to about 150 cP at a shear rate of about 40 sec$^{-1}$. In other embodiments, the treatment fluids of the present invention may exhibit a bulk viscosity in the range of from about 30 cP to about 50 cP at a shear rate of about 40 sec$^{-1}$.

The high salt concentration base fluids of the present invention may be any aqueous-based fluid. In some embodiments, the high salt concentration base fluid may be brine (water containing one or more salts dissolved therein); seawater (naturally occurring water containing one or more salts dissolved therein); produced water from a formation (water that is recovered along with oil or gas); reclaimed water (treated or untreated wastewater); and any combination thereof. In some embodiments, the salts in the high salt concentration base fluid may include, for example, salts comprising ions of aluminum; boron; barium; calcium; chloride; iron; potassium; magnesium; sodium; strontium; sulfate; carbonate; bicarbonate; and any combination thereof. In some embodiments, about 5% to about 100% of the salts in the high salt concentration base fluids of the present invention are divalent salts. In other embodiments, about 20% to about 100% of the salts in the high salt concentration base fluids of the present invention are divalent salts. In still other embodiments, about 50% to about 100% of the salts in the high concentration salt fluids of the present invention are divalent salts.

The charged polymeric gelling agent may be cationic or anionic. In preferred embodiments, the charged polymeric gelling agent is anionic. Examples of such suitable charged polymeric gelling agents for use in the methods and compositions of the present invention include, but are not limited to, a derivatized guar gum (e.g., carboxymethyl guar, carboxymethylhydroxyethyl guar, and carboxymethylhydroxypropyl guar ("CMHPG")); a cellulose derivative (e.g., hydroxyethyl cellulose, carboxyethylcellulose, carboxymethylcellulose, and carboxymethylhydroxyethylcellulose); xanthan; succinoglycan; alginate; chitosan; any derivative thereof; and any combination thereof. The term "derivative" is defined herein any compound that is made from one of the listed compounds, for example, by replacing one atom in one of the listed compounds with another atom or group of atoms, ionizing one of the listed compounds, or creating a salt of one of the listed compounds. In some preferred embodiments, the charged polymeric gelling agent is a derivatized guar gum or a cellulose derivative. Examples of suitable commercially available charged polymeric gelling agents for use in the methods and compositions of the present invention include, but are not limited to, WG-39™ and WG36™, available from Halliburton Energy Services, Inc. in Houston, Tex. In some embodiments, the charged polymeric gelling agent of the present invention is present in an amount in the range of from about 1 pounds per thousand gallons ("ppt") to about 100 ppt of the treatment fluid. In other embodiments, the charged polymeric gelling agent of the present invention is present in an amount in the range of from about 10 ppt to about 65 ppt of the treatment fluid. In other embodiments, the charged polymeric gelling agent of the present invention is present in an amount in the range of from about 20 ppt to about 65 ppt of the treatment fluid. The concentration of the charged polymeric gelling agent may be dependent upon a number of factors such as, for example, the type of polymeric gelling agent used, the salts present in the treatment fluid, the type of subterranean formation operation used, the conditions of the subterranean formation itself (e.g., pH, temperature, etc.), and the like. One of ordinary skill in the art, with the benefit of this disclosure, will recognize the appropriate concentration of the charged polymeric gelling agent to achieve a particular result.

In some embodiments, the charged polymeric gelling agents of the present invention may be additionally crosslinked. Such crosslinking may synergistically work with the charged polymeric gelling agent to enhance proppant suspension in the treatment fluid. Suitable crosslinking agents may include metal ions capable of crosslinking at least two molecules of the charged polymeric gelling agent. Examples of suitable crosslinking agents include, but are not limited to, borate ions; magnesium ions; zirconium IV ions; titanium IV ions; aluminum ions; antimony ions; chromium ions; iron ions; copper ions; zinc ions; and any combination thereof. These ions may be provided by providing any compound that is capable of producing one or more of these ions. Examples of such compounds include, but are not limited to, ferric chloride; boric acid; disodium octaborate tetrahydrate; sodium diborate; pentaborate; ulexite; colemanite; magnesium oxide; zirconium lactate; zirconium triethanol amine; zirconium lactate triethanolamine; zirconium carbonate; zirconium acetylacetonate; zirconium malate; zirconium citrate; zirconium diisopropylamine lactate; zirconium glycolate; zirconium triethanol amine glycolate; zirconium lactate glycolate; titanium lactate; titanium malate; titanium citrate; titanium ammonium lactate; titanium triethanolamine; titanium acetylacetonate; aluminum lactate; aluminum citrate; antimony compounds; chromium compounds; iron compounds; copper compounds; zinc compounds; and combinations thereof. In some embodiments, the metal ions used to crosslink the charged polymeric gelling agent of the present invention may be delivered as chelates. Suitable commercially available crosslinking agents for use in the methods and compositions of the present invention include, but are not limited to, CL-23™ and BC140™ available from Halliburton Energy Services, Inc. in Houston, Tex. The crosslinking agent may be present in the treatment fluids of the present invention in an amount in the range of from about 3.5 parts per million ("ppm") to about 700 ppm by weight of the treatment fluid. In certain embodiments, the crosslinking agent may be present in the treatment fluids of the present invention in an amount in the range of from about 35 ppm to about 700 ppm by weight of the treatment fluid.

The treatment fluids of the present invention, in some embodiments, may additionally comprise a breaker including, but not limited to, an enzyme breaker; an oxidizing breaker; an acid breaker; a delayed breaker; or any combination thereof. The breakers may cause the treatment fluids of the present invention to become less viscous fluids that can more easily be produced back to the surface, for example, after they have been used to place proppant particles in subterranean fractures. In some embodiments, the breaker may be formulated to remain inactive until it is "activated" by, among other things, certain conditions in the fluid (e.g., pH, temperature, and the like) and/or interaction with some other substance. In some embodiments, the breaker may be delayed by encapsulation with a coating (e.g. a porous coatings through which the breaker may diffuse slowly, or a degradable coating that degrades downhole) that delays the release of the breaker. In other embodiments the breaker may be a degradable material (e.g. polylactic acid or polygylcolic acid) that releases an acid or alcohol in the present of an aqueous liquid. An example of a suitable commercially available breaker includes, but is not limited to, OptiFlo III™ available from Halliburton Energy Services, Inc. from Houston, Tex., which is a delayed breaker having a permeable coating susceptible to elevated temperature. In certain embodiments, the breaker used may be present in the treatment fluids of the present invention in an amount in the range of from about 0.1 ppt to about 10 ppt by volume of the treatment fluid. One of ordinary skill in the art, with the benefit of this disclosure, will recognize the type and amount of a breaker to include in certain treatment fluids of the present invention based on, among other factors, the desired amount of delay time before breaking, the type of charged polymeric gelling agents used, the temperature conditions of a particular application, the pH of the first treatment fluid, and the like.

In some embodiments, a buffer may be included in the treatment fluids of the present invention to control the pH of the treatment fluid, such that the pH of the treatment fluid is in the range of from about 4 to about 8. In some preferred embodiments, a buffer may be included in the treatment fluids of the present invention such that the pH of the treatment fluid is in the range of from about 5 to about 7. Suitable buffers may include, but are not limited to, mixtures of a salt of a weak acid and an organic acid such as sodium carbonate and fumaric acid; sodium acetate and fumaric acid; ammonium acetate and acetic acid; sodium citrate and citric acid; and the like. An example of a suitable commercially available buffer includes, but is not limited to, BA20™ available from Halliburton Energy Services, Inc. in Houston, Tex., which may maintain the pH of the treatment fluids of the present invention in the range of 4.5 to 6.5. The ratio of the salt and acid in the buffer can be varied to provide the desired buffered pH. The particular pH for a given treatment fluid will be recognized by one of skill in the art depending on particular factors such as, for example, the type of charged polymeric gelling agent used, the conditions (e.g., pH and temperature) of the subterranean formation being treated, the particular subterranean operation being performed, and the like.

The charged polymeric gelling agents and/or crosslinking agents of the present invention are unexpectedly effective at providing proppant suspension in high salt concentration treatment fluids, despite that such treatment fluids exhibit overall low bulk viscosities. In fact, the bulk viscosity of the treatment fluids of the present invention (as measured in a rheometer) is low enough to be typically considered incapable of adequate proppant suspension. By way of example, in some embodiments, the treatment fluid has a bulk viscosity of between about 30 cP to about 150 cP at a shear rate of 40 about sec$^{-1}$. In other embodiments, the treatment fluid has a bulk viscosity of between about 30 cP to about 50 cP at a shear rate of about 40 sec$^{-1}$. Despite the low bulk viscosity of the treatment fluids of the present invention, the proppant particulates suspended therein possess a dynamic settling velocity in the range of about 0 mm/min to about 2 mm/min for up to 24 hours. In other embodiments, the proppant particulates suspended in the treatment fluids of the present invention possess a dynamic settling velocity in the range of from about 0 mm/min to about 1 mm/min for up to 24 hours. In yet other embodiments, the proppant particulates suspended in the treatment fluids of the present invention possess a dynamic settling velocity in the range of from about 0 mm/min to about 0.15 mm/min for up to 24 hours. Indeed, when compared to fresh water, the high salt concentration treatment fluids of the present invention exhibit improved proppant suspension, even at their low bulk viscosity values.

In some embodiments, the present invention provides a method of treating a subterranean formation comprising at least one fracture formed by introducing a substantially particulate-free fracturing fluid into the formation at a rate and pressure sufficient to create or enhance a fracture therein. Thereafter, proppant particulates are placed into the fracture by introducing into the subterranean formation a treatment fluid comprising a high salt concentration base fluid, a charged polymeric gelling agent, and proppant particulates suspended therein into the subterranean formation. The high salt concentration base fluid comprises a concentration of salt of at least about 0.5% to saturation and a bulk viscosity of between about 30 cP to about 150 cP at a shear rate of about 40 sec$^{-1}$. In other embodiments, the treatment fluid comprising the high salt concentration base fluid, charged polymeric gelling agent, and proppant particulates may be introduced into a subterranean formation at a rate and pressure sufficient to create or enhance at least one fracture therein. The proppant particulates are then placed in the fracture.

The fracturing fluid may be any fluid suitable for use in a subterranean operation, including the high salt concentration base fluids of the treatment fluid, so long as it is substantially particulate-free. Suitable fracturing fluids include oil-based fluids, aqueous-based fluids, aqueous-miscible fluids, water-in-oil emulsions, or oil-in-water emulsions. Suitable oil-based fluids may include, but are not limited to, alkanes; olefins; aromatic organic compounds; cyclic alkanes; paraffins; diesel fluids; mineral oils; desulfurized hydrogenated kerosenes; and any combination thereof. Suitable aqueous-based fluids may include, but are not limited to, fresh water; saltwater; brine (e.g., saturated salt water); and any combination thereof. Suitable aqueous-miscible fluids may include, but not be limited to, alcohols (e.g., methanol, ethanol, n-propanol, isopropanol, n-butanol, sec-butanol, isobutanol, and t-butanol); glycerins; glycols (e.g., polyglycols, propylene glycol, and ethylene glycol); polyglycol amines; polyols; any derivative thereof; any in combination with salts (e.g., sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate); any in combination with an aqueous-based fluid; and any combination thereof. Suitable water-in-oil emulsions, also known as invert emulsions, may have an oil-to-water ratio from a lower limit of greater than about 50:50, 55:45, 60:40, 65:35, 70:30, 75:25, or 80:20 to an upper limit of less than about 100:0, 95:5, 90:10, 85:15, 80:20, 75:25, 70:30, or 65:35 by volume in the base fluid, where the amount may range from any lower limit to any upper limit and encompass any subset therebetween. Examples of suitable invert emulsions include those disclosed in U.S. Pat. Nos. 5,905,061, 5,977,031, 6,828,279, 7,534,745, 7,645,723, and 7,696,131, each of which are incorporated herein by reference in their entirety. It should be noted that for water-in-oil and oil-inwater emulsions, any mixture of the above may be used including the water being and/or comprising an aqueous-miscible fluid.

Suitable materials that may be used as proppant in the methods and compositions of the present invention include but are not limited to sand; bauxite; ceramic materials; glass materials; polymer materials; nylon materials; polytetrafluoroethylene materials; nut shell pieces; cured resinous particulates comprising nut shell pieces; seed shell pieces; cured resinous particulates comprising seed shell pieces; fruit pit pieces; cured resinous particulates comprising fruit pit pieces; wood; composite particulates; and combinations thereof. Suitable composite particulates may comprise a binder and a filler material wherein suitable filler materials may include, but are not limited to, silica; alumina; fumed carbon; carbon black; graphite; mica; titanium dioxide; meta-silicate; calcium silicate; kaolin; talc; zirconia; boron; fly ash; hollow glass microspheres; solid glass; and any combination thereof. The mean proppant size generally may range from about 2 mesh to about 400 mesh on the U.S. Sieve Series; however, in certain circumstances, other mean proppant sizes may be desired and will be entirely suitable for practice of the present invention. In particular embodiments, preferred mean proppant size distribution ranges are one or more of 6/12, 8/16, 12/20, 16/30, 20/40, 30/50, 40/60, 40/70, or 50/70 mesh. It should be understood that the term "proppant," as used in this disclosure, includes all known shapes of materials, including substantially spherical materials; fibrous materials; polygonal materials (such as cubic materials); and any combination thereof.

The treatment fluids of the present invention may additionally comprise an additive selected from the group consisting of a weighting agent, an inert solid, a fluid loss control agent, an emulsifier, a dispersion aid, a corrosion inhibitor, an emulsion thinner, an emulsion thickener, a surfactant, a lost circulation material, a foaming agent, a gas, a biocide, a scale inhibitor, a friction reducer, a clay stabilizing agent, and any combination thereof.

To facilitate a better understanding of the present invention, the following examples of preferred or representative embodiments are given. In no way should the following examples be read to limit, or to define, the scope of the invention.

Example 1

In this example, the ability of the treatment fluids of the present invention to suspend proppant particulates was evaluated. A transparent cylindrical flow tube (couvette system) with the inner column equipped with a rotor was used to visualize the settling behavior of proppant particulates the treatment fluids of the present invention as compared to low or no salt concentration fluids. The equipment used for this test is described in U.S. Patent Pub. No. 2011/0219856 and World Intellectual Property Organization Patent Pub. No. 2010012975, the entire disclosures of which are incorporated herein by reference. However, one of skill in the art, with the benefit of this disclosure, would recognize that standard laboratory equipment could be used to perform the experiments described herein. A control low or no salt concentration fluid ("control fluid") was prepared using fresh water comprising 60 ppt WG39™ charged polymeric weighting agent, 2 gallons per thousand gallons ("gpt") CL-23™ crosslinking agent, and 2 gpt BA20™ buffer. Two experimental treatment fluids were prepared according to the teachings of the present invention. Treatment fluid 1 ("TF1") was prepared using salt water having 3.3% salt concentration comprising 60 ppt WG39™ charged polymeric weighting agent, 2 gpt CL-23™ crosslinking agent, and 2 gpt BA20™ buffer. To each of the control fluid and TF1, 2 pounds per gallon ("lb/gal") of 20/40 mesh bauxite proppant particulates were added. The treatment fluid was then pumped through the transparent cylindrical flow tube, which was rotated at a speed of 10 rpm, which is equivalent to a shear rate of approximately 6.5 sec$^{-1}$ at room temperature for approximately 24 hours. The position of the proppant particulates was viewed using IMAGEJ and evaluated using MATLAB®.

A linear regression was performed to determine the dynamic settling velocity of the proppant particulates in the control fluid and TF1 at a shear rate of about 6.5 sec$^{-1}$ for approximately 24 hours. TF1 demonstrated far superior proppant suspension as compared to the control fluid. TF1 possessed a dynamic settling velocity of 0 millimeters/minute ("mm/min") for approximately 24 hours. By contrast, the control fluid possessed a steady dynamic settling velocity of 4.5 mm/min. The results are shown in FIG. 1.

Example 2

In this example, the ability of the treatment fluids of the present invention to suspend proppant particulates was again evaluated, using Halliburton Energy Services, Inc.'s MIMIC™ Device. Details of the MIMIC™ Device can be found in U.S. Pat. Nos. 8,266,949; 7,712,526; 7,392,842; and 6,782,735, the entire disclosures of which are incorporated herein by reference. A control low or no salt concentration fluid ("control fluid") was prepared using fresh water comprising 60 ppt WG-39™ charged polymeric weighting agent, 2 gpt CL-23™ crosslinking agent, and 2 gpt BA20™ buffer. Two experimental treatment fluids were prepared according to the teachings of the present invention. Treatment fluid 3 ("TF3") was prepared using salt water having 3.3% salt concentration comprising 60 ppt WG39™ charged polymeric weighting agent, 2 gpt CL-23™ crosslinking agent, and 2 gpt BA20™ buffer. Treatment fluid 4 ("TF4") was prepared using salt water having 3.3% salt concentration comprising 60 ppt WG39™ charged polymeric weighting agent, 2 gpt CL-23™ crosslinking agent, 2 gpt BA20™ buffer, and 2 ppt OptiFlo III™ breaker. TF4 was prepared to determine the effect of high salt concentration base fluids on the performance of breakers. To each of the control fluid, TF3, and TF4, 8 lb/gal of sand proppant particulates were added.

Figure 2:
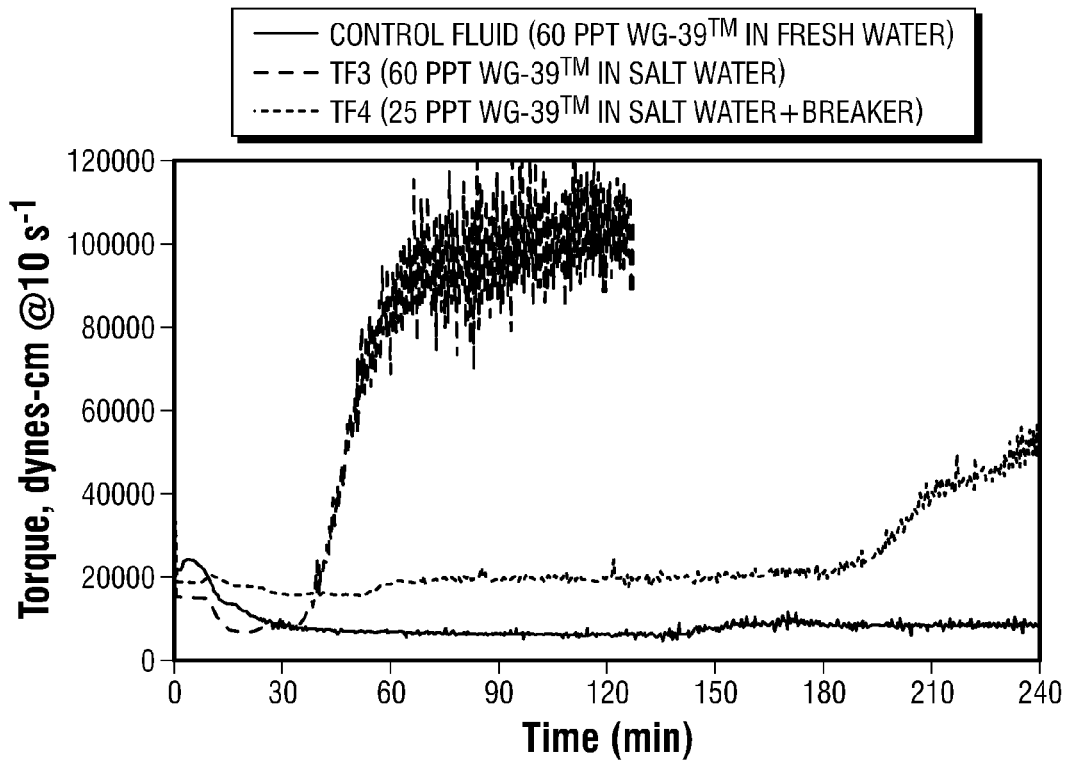
FIG. 2 demonstrates the capacity of the high salinity, low viscosity subterranean treatment fluids of the present invention, either alone or in combination with a breaker, to suspend proppant particulates.

MIMIC™ testing was performed at 93.3° C. (200° F.) for 4 hours using 75 ml of each of the control fluid, TF3, and TF4. The MIMIC™ Device correlates torque with the proppant suspension capacity of a treatment fluid. Specifically, constant torque values indicate stable proppant suspension and rapid torque increases indicate proppant settling. Consistent with Example 1, TF3 demonstrated far superior proppant suspension as compared to the control fluid. The proppant particulates in TF3 remained in suspension for the duration of the test period, whereas the proppant particulates in the control fluid began to settle out after approximately 3 hours, as indicated by an increase in torque. Additionally, the presence of the breaker in TF4 did not affect the superior suspension capacity of TF4 as compared to the control fluid, as demonstrated by a low torque value. However, once the breaker broke after the passage of approximately 30 minutes a sharp increase in torque was observed, as expected. The results of the MIMIC™ Device test are shown in FIG. 2.

Example 3

Figure 3:
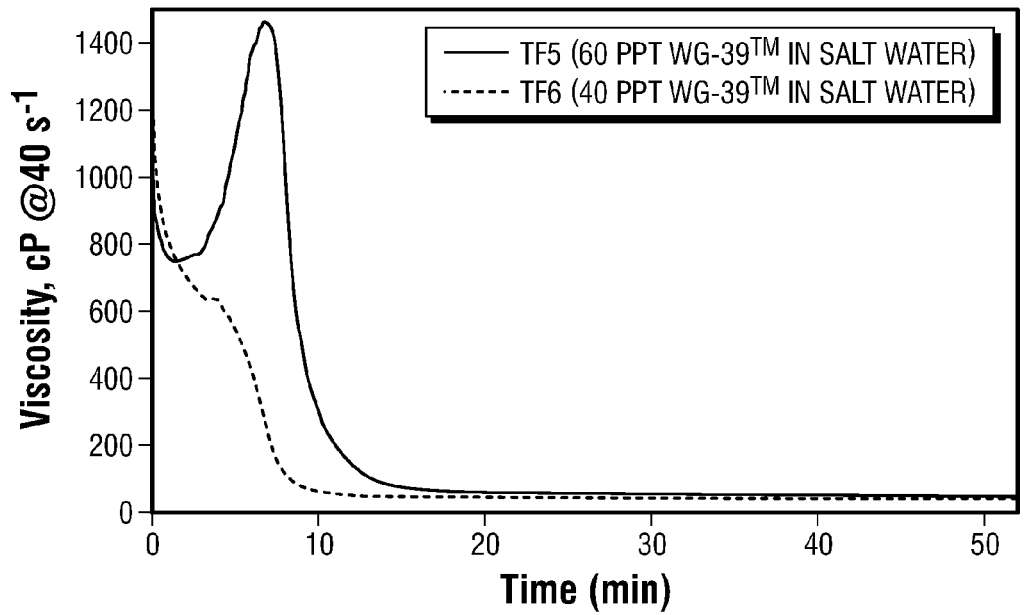
FIG. 3 shows viscosity profiles using a Chandler 5550 viscometer of the high salinity, low viscosity subterranean treatment fluids of the present invention.

In this example, the viscosity of the treatment fluids of the present invention were evaluated. Two experimental treatment fluids were prepared according to the teachings of the present invention. Treatment fluid 5 ("TF5") was prepared using salt water having 3.3% salt concentration comprising 60 ppt WG-39™ charged polymeric weighting agent, 2 gpt CL-23™ crosslinking agent, and 2 gpt BA20™ buffer. Treatment fluid 6 ("TF6") was prepared using salt water having 3.3% salt concentration comprising 40 ppt WG39™ charged polymeric weighting agent, 2 gpt CL-23™ crosslinking agent, and 2 gpt BA20™ buffer. Using a Chandler Model 5550 Viscometer, 44 ml of TF5 and TF6 were tested at 71.1° C. (160° F.) to determine their viscosity profiles. As shown in FIG. 3, the viscosity profiles of both TF5 and TF6 indicate that after the passage of approximately 10 minutes, their viscosity drops to below about 50 cP @ 40 sec$^{-1}$. Such a low viscosity typically indicates that the treatment fluid will not be suitable for proppant suspension.

Upon visual inspection, TF6, comprising 40 ppt of WG-39™, appeared as a thin fluid, consistent with the Chandler test viscosity profile. However, upon visual inspection, TF5, comprising 60 ppt of WG-39™, retained the structure and appearance of a highly viscous fluid, despite having a Chandler test viscosity profile of below about 50 cP @ 40 sec$^{-1}$. The results demonstrate that the treatment fluids of the present invention may remain highly viscous while registering a low "bulk viscosity" when measured by conventional means (i.e., the Chandler viscometer). Thus, such fluids are capable of providing excellent proppant suspension.

In various embodiments, systems configured for delivering the treatment fluids described herein to a downhole location are described. In various embodiments, the systems can comprise a pump fluidly coupled to a tubular, the tubular containing the high salinity, low viscosity subterranean treatment fluids of the present invention.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the treatment fluid to a subterranean formation at or above a fracture gradient of the subterranean formation, but it may also be used in cases where fracturing is not desired. In some embodiments, the high pressure pump may be capable of fluidly conveying particulate matter, such as proppant particulates, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluid to the high pressure pump. In such embodiments, the low pressure pump may "step up" the pressure of the treatment fluid before it reaches the high pressure pump.

In some embodiments, the systems described herein can further comprise a mixing tank that is upstream of the pump and in which the treatment fluid is formulated. In various embodiments, the pump (e.g., a low pressure pump, a high pressure pump, or a combination thereof) may convey the treatment fluid from the mixing tank or other source of the treatment fluid to the tubular. In other embodiments, however, the treatment fluid can be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluid may be drawn into the pump, elevated to an appropriate pressure, and then introduced into the tubular for delivery downhole.

Figure 4:
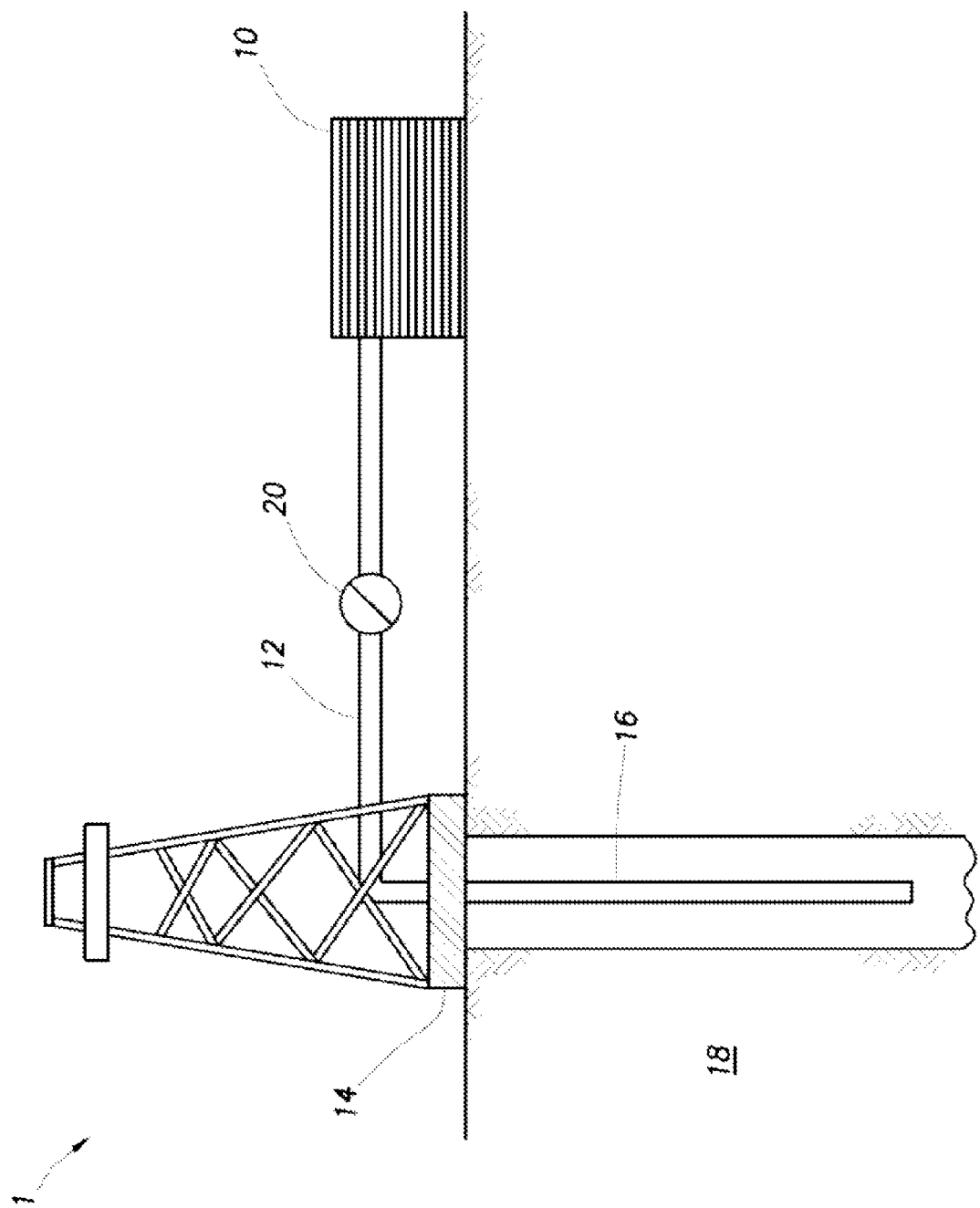
FIG. 4 depicts an embodiment of a system configured for delivering the high salinity, low viscosity subterranean treatment fluids of the present invention to a downhole location.

FIG. 4 shows an illustrative schematic of a system that can deliver treatment fluids of the present invention to a downhole location, according to one or more embodiments. It should be noted that while FIG. 4 generally depicts a land-based system, it is to be recognized that like systems may be operated in subsea locations as well. As depicted in FIG. 4, system 1 may include mixing tank 10, in which a treatment fluid of the present invention may be formulated. The treatment fluid may be conveyed via line 12 to wellhead 14, where the treatment fluid enters tubular 16, tubular 16 extending from wellhead 14 into subterranean formation 18. Upon being ejected from tubular 16, the treatment fluid may subsequently penetrate into subterranean formation 18. Pump 20 may be configured to raise the pressure of the treatment fluid to a desired degree before its introduction into tubular 16. It is to be recognized that system 1 is merely exemplary in nature and various additional components may be present that have not necessarily been depicted in FIG. 4 in the interest of clarity. Non-limiting additional components that may be present include, but are not limited to, supply hoppers, valves, condensors, adapters, joints, gauges, sensors, compressors, pressure controllers, pressure sensors, flow rate controllers, flow rate sensors, temperature sensors, and the like.

Although not depicted in FIG. 4, the treatment fluid may, in some embodiments, flow back to wellhead 14 and exit subterranean formation 18. In some embodiments, the treatment fluid that has flowed back to wellhead 14 may subsequently be recovered and recirculated to subterranean formation 18.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 4.

Embodiments disclosed herein include:

A. A method of treating a subterranean formation comprising: providing a treatment fluid comprising a high salt concentration base fluid, a charged polymeric gelling agent, and proppant particulates suspended therein; wherein the high salt concentration base fluid comprises a concentration of salt in the range of from about 0.5% to saturation, and wherein the treatment fluid has a bulk viscosity of from about 30 cP to about 150 cP at a shear rate of about 40 sec$^{-1}$; and introducing the treatment fluid comprising the proppant particulates into the subterranean formation.

B. A method of treating a subterranean formation comprising: providing a treatment fluid comprising a high salt concentration base fluid, a charged polymeric gelling agent, and proppant particulates suspended therein, wherein the high salt concentration base fluid comprises a concentration of salt in the range of from about 0.5% to saturation, and wherein the treatment fluid has a bulk viscosity of between about 30 cP to about 150 cP at a shear rate of about 40 sec$^{-1}$; introducing the treatment fluid into the subterranean formation at a rate and pressure sufficient to create or enhance at least one fracture therein; and placing a portion of the proppant particulates in a portion of the fracture.

C. A method of treating a subterranean formation comprising: providing a substantially particulate-free fracturing fluid; providing a treatment fluid comprising a high salt concentration base fluid, a charged polymeric gelling agent, and proppant particulates suspended therein, wherein the high salt concentration base fluid comprises a concentration of salt in the range of from about 0.5% to saturation, and wherein the treatment fluid has a bulk viscosity of between about 30 cP to about 150 cP at a shear rate of about 40 sec$^{-1}$; introducing the fracturing fluid into the subterranean formation at a rate and pressure sufficient to create or enhance at least one fracture therein; introducing the treatment fluid into the subterranean formation; and placing a portion of the proppant particulates in a portion of the fracture.

Each of embodiments A, B, and C may have one or more of the following additional elements in any combination Element 1: Wherein between about 5% to about 100% of the salt comprises divalent salts.

Element 2: Wherein the charged polymeric gelling agent is a derivatized guar gum; a cellulose derivative; xanthan; succinoglycan; alginate, chitosan; any derivative thereof; and any combination thereof.

Element 3: Wherein the charged polymeric gelling agent is crosslinked with a crosslinking agent.

Element 4: Wherein the charged polymeric gelling agent is present in an amount in the range of from about 1 ppt to about 100 ppt of the treatment fluid.

Element 5: Wherein the treatment fluid further comprises a crosslinking agent; a breaker; a buffer; a surfactant; a clay control additive; a biocide; a scale inhibitor; and any combination thereof.

Element 6: Wherein the proppant particulates suspended in the treatment fluid possess a dynamic settling velocity in the range of about 0 mm/min to about 2 mm/min for up to about 24 hours.

Element 7: Wherein the treatment fluid further comprises an additive selected from the group consisting of a weighting agent, an inert solid, a fluid loss control agent, an emulsifier, a dispersion aid, a corrosion inhibitor, an emulsion thinner, an emulsion thickener, a surfactant, a lost circulation material, a foaming agent, a gas, a biocide, a scale inhibitor, a friction reducer, a clay stabilizing agent, and any combination thereof.

By way of non-limiting example, exemplary combinations applicable to A, B, C include: A with 1 and 4; B with 2, 5, and 7; C with 4 and 6.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claim, each numerical parameter should at least be construed in light of the number of reported significant digits and by applying ordinary rounding techniques.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method of treating a subterranean formation comprising:
  providing a treatment fluid comprising a high salt concentration base fluid, a charged polymeric gelling agent, and proppant particulates suspended therein,
    wherein the charged polymeric gelling agent is present in an amount in the range of from about 1 pounds per thousand gallons (ppt) to about 100 ppt of the treatment fluid,
    wherein the high salt concentration base fluid comprises a concentration of salt in the range of from 25% to saturation,
    wherein between about 20% to about 100% of the concentration of the salt comprises divalent salts, wherein the treatment fluid has a bulk viscosity of from about 30 cP to about 150 cP at a shear rate of about 40 sec$^{-1}$, and wherein the type, size, and amount of proppant particulates suspended in the treatment fluid are selected to possess a dynamic settling velocity in the range of about 0 mm/min to about 2 mm/min for up to about 24 hours; and introducing the treatment fluid comprising the proppant particulates into the subterranean formation.

2. The method of claim 1, wherein the charged polymeric gelling agent is a derivatized guar gum; a cellulose derivative; xanthan; succinoglycan; alginate, chitosan; any derivative thereof; and any combination thereof.

3. The method of claim 1, wherein the charged polymeric gelling agent is crosslinked with a crosslinking agent.

4. The method of claim 1, wherein the treatment fluid further comprises a crosslinking agent; a breaker; a buffer; a surfactant; a clay control additive; a biocide; a scale inhibitor; and any combination thereof.

5. A method of treating a subterranean formation comprising:

providing a treatment fluid comprising a high salt concentration base fluid, a charged polymeric gelling agent, and proppant particulates suspended therein, wherein the charged polymeric gelling agent is present in an amount in the range of from about 1 pounds per thousand gallons (ppt) to about 100 ppt of the treatment fluid, wherein the high salt concentration base fluid comprises a concentration of salt in the range of from 25% to saturation, wherein between about 20% to about 100% of the concentration of the salt comprises divalent salts, wherein the treatment fluid has a bulk viscosity of between about 30 cP to about 150 cP at a shear rate of about 40 sec$^{-1}$, and wherein the type, size, and amount of proppant particulates suspended in the treatment fluid are selected to possess a dynamic settling velocity in the range of about 0 mm/min to about 2 mm/min for up to about 24 hours;

introducing the treatment fluid into the subterranean formation at a rate and pressure sufficient to create or enhance at least one fracture therein; and placing a portion of the proppant particulates in a portion of the fracture.

6. The method of claim 5, wherein the charged polymeric gelling agent is a wherein the charged polymeric gelling agent is a derivatized guar gum; a cellulose derivative; xanthan; succinoglycan; alginate; chitosan; any derivative thereof; and any combination thereof.

7. The method of claim 5, wherein the charged polymeric gelling agent is crosslinked with a crosslinking agent.

8. The method of claim 5, wherein the treatment fluid further comprises a crosslinking agent; a breaker; a buffer; a surfactant; a clay control additive; a biocide; a scale inhibitor; and any combination thereof.

9. A method of treating a subterranean formation comprising:

providing a substantially particulate-free fracturing fluid;

providing a treatment fluid comprising a high salt concentration base fluid, a charged polymeric gelling agent, and proppant particulates suspended therein, wherein the charged polymeric gelling agent is present in an amount in the range of from about 1 pounds per thousand gallons (ppt) to about 100 ppt of the treatment fluid, wherein the high salt concentration base fluid comprises a concentration of salt in the range of from 25% to saturation, wherein between about 20% to about 100% of the concentration of the salt comprises divalent salts, wherein the treatment fluid has a bulk viscosity of between about 30 cP to about 150 cP at a shear rate of about 40 sec$^{-1}$, and wherein the type, size, and amount of proppant particulates suspended in the treatment fluid are selected to possess a dynamic settling velocity in the range of about 0 mm/min to about 2 mm/min for up to about 24 hours;

introducing the fracturing fluid into the subterranean formation at a rate and pressure sufficient to create or enhance at least one fracture therein;

introducing the treatment fluid into the subterranean formation; and placing a portion of the proppant particulates in a portion of the fracture.

10. The method of claim 9, wherein the charged polymeric gelling agent is a derivatized guar gum; a cellulose derivative; xanthan; succinoglycan;

alginate; chitosan; any derivative thereof; and any combination thereof.

11. The method of claim 9, wherein the treatment fluid further comprises a crosslinking agent; a breaker; a buffer; a surfactant; a clay control additive; a biocide; a scale inhibitor; and any combination thereof.

* * * * *